(12) United States Patent
Cheng et al.

(10) Patent No.: US 12,041,532 B2
(45) Date of Patent: *Jul. 16, 2024

(54) METHOD OF SYSTEM INFORMATION TRANSMISSION AND ACQUISITION

(71) Applicant: ACER INCORPORATED, New Taipei (TW)

(72) Inventors: Ching-Wen Cheng, New Taipei (TW); Hung-Chen Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 331 days.

This patent is subject to a terminal disclaimer.

(21) Appl. No.: 17/569,531

(22) Filed: Jan. 6, 2022

(65) Prior Publication Data

US 2022/0132397 A1     Apr. 28, 2022

Related U.S. Application Data

(63) Continuation of application No. 15/885,723, filed on Jan. 31, 2018, now Pat. No. 11,252,641.

(Continued)

(51) Int. Cl.
*H04W 48/10*     (2009.01)
*H04L 5/00*     (2006.01)
(Continued)

(52) U.S. Cl.
CPC ........... *H04W 48/10* (2013.01); *H04L 5/0053* (2013.01); *H04L 5/0091* (2013.01);
(Continued)

(58) Field of Classification Search
None
See application file for complete search history.

(56) References Cited

U.S. PATENT DOCUMENTS 9,462,548 B1   10/2016  Govindassamy
10,979,968 B2   4/2021  Lee
(Continued)

FOREIGN PATENT DOCUMENTS

| CN | 103581998 A | 2/2014 |
| CN | 103997774 A | 8/2014 |
| CN | 106231637 A | 12/2016 |

OTHER PUBLICATIONS

NEC, System information on demand in standalone NR, 3GPP TSG RAN WG2 Meeting #94, R2-163980, XP051105321, May 23-27, 2016, Nanjing, China.

(Continued)

*Primary Examiner* — Kenneth B Wells
(74) *Attorney, Agent, or Firm* — Winston Hsu (57) ABSTRACT

A method of system information transmission for a network in a wireless communication system is disclosed. The method comprises broadcasting essential minimum system information (SI) of a cell of the wireless communication system with fixed scheduled on a downlink broadcast channel, wherein the essential minimum SI includes scheduling information for non-essential minimum SI of at least one of the cell and an auxiliary cell or a frequency location, the non-essential minimum SI is broadcasted with dynamically scheduled on a downlink shared channel, and the scheduling information includes a time and frequency resource configuration and an availability information for indicating whether the cell broadcasts the non-essential minimum SI.

20 Claims, 12 Drawing Sheets

Related U.S. Application Data (60) Provisional application No. 62/453,527, filed on Feb. 2, 2017.

(51) Int. Cl.
*H04W 48/12* (2009.01)
*H04W 48/16* (2009.01)
*H04W 48/20* (2009.01)
*H04W 84/04* (2009.01)

(52) U.S. Cl.
CPC ........... *H04L 5/0098* (2013.01); *H04W 48/12* (2013.01); *H04W 48/16* (2013.01); *H04W 48/20* (2013.01); *H04W 84/045* (2013.01)

(56) References Cited

U.S. PATENT DOCUMENTS

| | | |
|---|---|---|
| 11,252,641 B2 * | 2/2022 | Cheng .................. H04L 5/0053 |
| 2010/0029283 A1 | 2/2010 | Iwamura |
| 2011/0051848 A1 | 3/2011 | Yuk |
| 2013/0079041 A1 | 3/2013 | Kunugi |
| 2015/0023235 A1 | 1/2015 | Lightstone |
| 2015/0098452 A1 | 4/2015 | Dalsgaard |
| 2015/0181575 A1 | 6/2015 | Ng |
| 2015/0341831 A1 | 11/2015 | Liu |
| 2015/0382284 A1 | 12/2015 | Brismar |
| 2016/0205671 A1 | 7/2016 | Tabet |
| 2016/0242206 A1 | 8/2016 | Ohlsson |
| 2016/0374109 A1 | 12/2016 | Rico Alvarino |
| 2017/0215207 A1 | 7/2017 | Yi |
| 2017/0251500 A1 | 8/2017 | Agiwal |
| 2017/0280481 A1 | 9/2017 | Stern-Berkowitz |
| 2017/0311286 A1 | 10/2017 | Yi |
| 2018/0035361 A1 | 2/2018 | Ishii |
| 2018/0049159 A1 | 2/2018 | Gu |
| 2018/0063815 A1 | 3/2018 | Ishii |
| 2018/0109995 A1 | 4/2018 | Akkarakaran |
| 2018/0132168 A1 | 5/2018 | Ingale |
| 2018/0184410 A1 | 6/2018 | John Wilson |
| 2019/0394708 A1 | 12/2019 | Damnjanovic |

OTHER PUBLICATIONS

Huawei, Cell selection for NR non-standalone and NR standalone UE operation, 3GPP TSG-RAN WG2 Meeting #96 R2-168569, Reno, Nevada, US, p. 1-4 ,Nov. 14, 2016.

Huawei, Cell selection for Option 3,7 and 2,4 capable UE, 3GPP TSG-RAN WG2 NR Ad Hoc R2-1700182, Spokane, USA, p. 1-4. ,Jan. 17, 2017.

3GPP, "3rd Generation Partnership Project; Technical Specification Group Radio Access Network; Evolved Universal Terrestrial Radio Access (E-UTRA); Radio Resource Control (RRC); Protocol specification (Release 13)", cover page, p. 22, pp. 29-42, and pp. 222-227, 3GPP TS 36.331 V13.0.0 (Dec. 2015).

3GPP, "3rd Generation Partnership Project; Technical Specification Group Radio Access Network; Evolved Universal Terrestrial Radio Access (E-UTRA); User Equipment (UE) procedures in idle mode (Release 13)", pp. 1-42, 3GPP TS 36.304 V13.0.0 (Dec. 2015).

ETSI TS 138.300 V15.2.0 (3GPP TS 38.300 version 15.2.0, Release 15), Sep. 2018, cover page + pp. 1-85.

* cited by examiner

FIG. 12

METHOD OF SYSTEM INFORMATION TRANSMISSION AND ACQUISITION

CROSS REFERENCE TO RELATED APPLICATIONS

This application is a continuation application of U.S. Application Ser. No. 15/885,723, filed on Jan. 31, 2018, now U.S. Pat. No. 11,252,641, which claims the benefit of U.S. Provisional Application No. 62/453,527, filed on Feb. 2, 2017. The contents of these applications are incorporated herein by reference.

BACKGROUND OF THE INVENTION

1. Field of the Invention

The present invention relates to a method used in a wireless communication system, and more particularly, to a method of system information transmission and acquisition in the wireless communication system.

2. Description of the Prior Art

3GPP in 5G new radio (NR) access technology proposes standalone and non-standalone NR cell deployment. Standalone cell can be selected and accessed by a UE without assistance information from other cells, whereas non-standalone cell cannot be selected nor accessed by a UE without assistance information from other cells.

In addition, system information (SI) of 5G NR system includes essential minimum system information, which is fixed scheduled on a physical downlink broadcast channel (e.g., the physical broadcast channel (PBCH) of LTE or the NR-PBCH of 5G NR) and is organized into single system information block (SIB), non-essential minimum SI, which is dynamically scheduled on a physical downlink shared channel (e.g., the physical downlink share channel (PDSCH) of LTE or the NR-PDSCH of 5G NR) and is organized into one or more system information blocks (SIBs), and other SI, which could be periodically broadcast or on-demand, namely requested by the UE.

Fixed scheduled implies the size of the data unit is fixed, the volume of the radio resource to transmit the data unit is fixed, the radio resource location for transmitting the data unit is fixed in frequency domain, and the periodicity is fixed in time domain. Dynamically scheduled implies the size of the data unit could be dynamic, the volume of the radio resource to transmit the data unit could be dynamically arranged by the network, the radio resource location for transmitting the data unit is dynamically arranged by the network side in frequency domain, the periodicity of the present of the radio resource for transmitting the data unit is dynamically arranged by the network in time domain.

Based on the current mechanism, not every NR cell broadcasts SI or the entire SI, and there may be cells in the system on which the UE cannot camp and do not broadcast the entire SI, such as non-standalone cells. However, there is no specification for a UE to determine whether a cell is campable or not, which causes power consumption and time delay in cell selection. Besides, there is no specification for the UE to know SI or SIB is periodically broadcasted or on-demand, and thus the UE may not know how to acquire the SI/SIB.

SUMMARY OF THE INVENTION

It is therefore an objective to provide a method of system information transmission and acquisition to solve the above problem.

The present invention discloses a method of system information transmission for a cell in a wireless communication system. The method comprises broadcasting essential minimum system information (SI) of the cell of the wireless communication system with fixed size on a downlink broadcast channel, wherein the essential minimum SI includes a first scheduling information for non-essential minimum SI of at least one of the cell, an auxiliary cell or a frequency location, and the essential minimum SI includes a time and frequency resource configuration and an availability information for indicating whether the cell broadcasts the non-essential minimum SI; and broadcasting the non-essential minimum SI with dynamically scheduled on a downlink shared channel according to the availability information, such that a mobile device in the wireless communication system is able to obtain the non-essential minimum SI with dynamic scheduled on the downlink shared channel according to the first scheduling information of the essential minimum SI, to determine whether the cell broadcasts remaining parts of the non-essential minimum SI according to a second scheduling information included in the obtained non-essential minimum SI, and to obtain the remaining parts of the non-essential minimum SI according to the second scheduling information; wherein the availability information is set to a first value for indicating that the cell broadcasts the non-essential minimum SI, and is set to a second value for indicating that the cell does not broadcast the non-essential minimum SI; wherein the non-essential minimum SI is a minimum SI.

The present invention discloses a method of system information acquisition for a mobile device in a wireless communication system. The method comprises receiving essential minimum system information (SI) of a cell of the wireless communication system with fixed size on a downlink broadcast channel, wherein the essential minimum SI includes a first scheduling information for non-essential minimum SI, and the essential minimum SI includes a time and frequency resource configuration and an availability information for indicating whether the cell broadcasts the non-essential minimum SI, and wherein the availability information is set to a first value for indicating that the cell broadcasts the non-essential minimum SI, and is set to a second value for indicating that the cell does not broadcast the non-essential minimum SI; obtaining the non-essential minimum SI with dynamic scheduled on a downlink shared channel according to the first scheduling information of the essential minimum SI when the availability information indicates that the cell broadcasts the non-essential minimum SI; determining whether the cell broadcasts remaining parts of the non-essential minimum SI according to a second scheduling information included in the obtained non-essential minimum SI; obtaining the remaining parts of the non-essential minimum SI according to the second scheduling information; and determining whether the cell is campable according to the availability information of the first scheduling information; wherein the non-essential minimum SI is a minimum SI.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
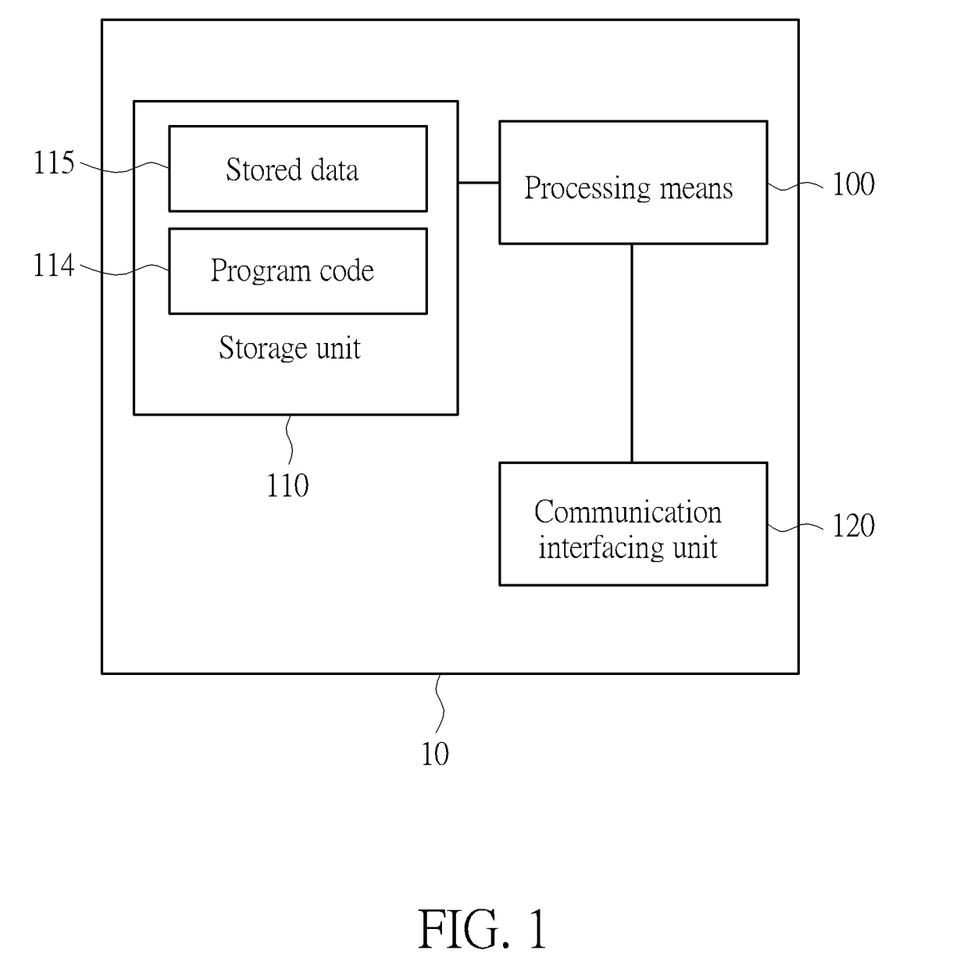
FIG. 1 is a schematic diagram of an exemplary communication device.

FIG. 1 is a schematic diagram of an exemplary communication device 10. The communication device 10 can be a user equipment (UE) or a cellular base station. The communication device 10 may include a processing means 100 such as a microprocessor or Application Specific Integrated Circuit (ASIC), a storage unit 110 and a communication interfacing unit 120. The storage unit 110 may be any data storage device that can store program code 114 and stored data 115, for access by the processing means 100. Examples of the storage unit 110 include but are not limited to a subscriber identity module (SIM), read-only memory (ROM), flash memory, random-access memory (RAM), CD-ROMs, magnetic tape, hard disk, and optical data storage device. The communication interfacing unit 120 is preferably a radio transceiver and can exchange wireless signals according to processing results of the processing means 100.

Figure 2:
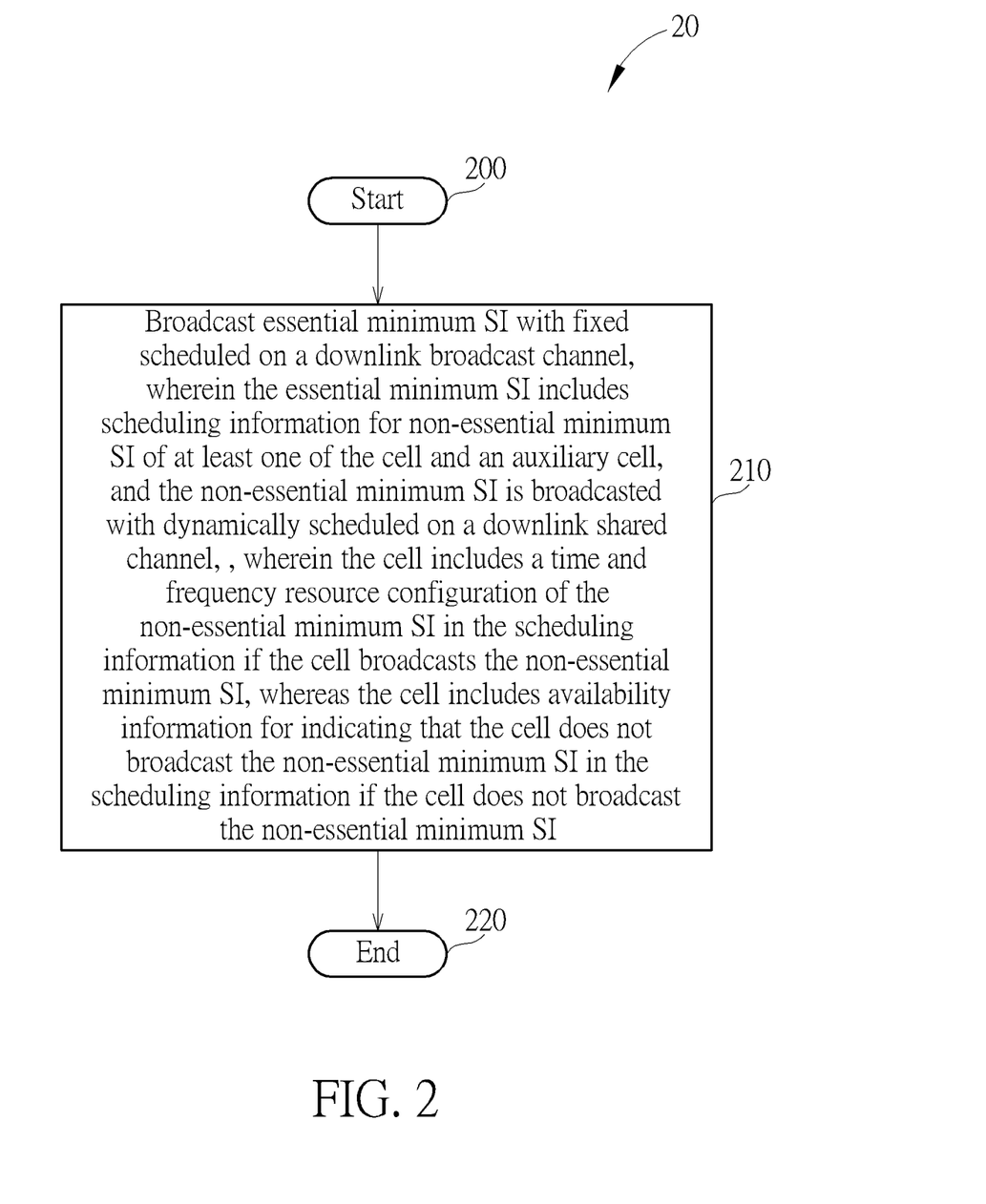
FIG. 2 is a flowchart of an exemplary process according to the present disclosure.

Please refer to FIG. 2, which is a flowchart of a process 20 according to an example of the present disclosure. The process 20 is utilized in the base station of FIG. 1, hereafter referred to a cell (e.g. a macro cell, micro cell, small cell, etc.), for SI transmission. The system information (SI) may be stored in the storage unit 110. The process 20 may be compiled into a program code 114 to be stored in the storage unit 110, and may include the following steps:

Step 200: Start.

Step 210: Broadcast essential minimum SI with fixed scheduled on a downlink broadcast channel, wherein the essential minimum SI includes scheduling information for non-essential minimum SI of at least one of the cell and an auxiliary cell, and the non-essential minimum SI is broadcasted with dynamically scheduled on a downlink shared channel, wherein the cell includes a time and frequency resource configuration of the non-essential minimum SI in the scheduling information if the cell broadcasts the non-essential minimum SI, whereas the cell includes availability information for indicating that the cell does not broadcast the non-essential minimum SI in the scheduling information if the cell does not broadcast the non-essential minimum SI.

Step 220: End.

According to the process 20, the cell transmits the scheduling information of the essential minimum SI with parameter to indicate whether the cell is campable. In detail, the cell includes the availability information in the essential minimum SI to assist cell selection in 5G NR system.

In detail, the essential minimum SI includes scheduling information for the non-essential minimum SI and an identity of the essential minimum SI. Therefore, a UE could store the essential minimum SI with the identity, and may not re-acquire the stored essential minimum SI. In an example, the identity of the essential minimum SI includes a timing index. The scheduling information of the essential minimum SI includes a type identifier to identify the type of the non-essential minimum SI associated with the essential minimum SI, which includes the association of the numerology for the non-essential minimum SI, availability information (e.g. Enumerate {true, false}) to identify whether the cell broadcasts any non-essential minimum SI, frequency location for associating the non-essential minimum SI with the essential minimum SI, bandwidth, and timing information for associating the non-essential minimum SI with the essential minimum SI.

Figure 3:
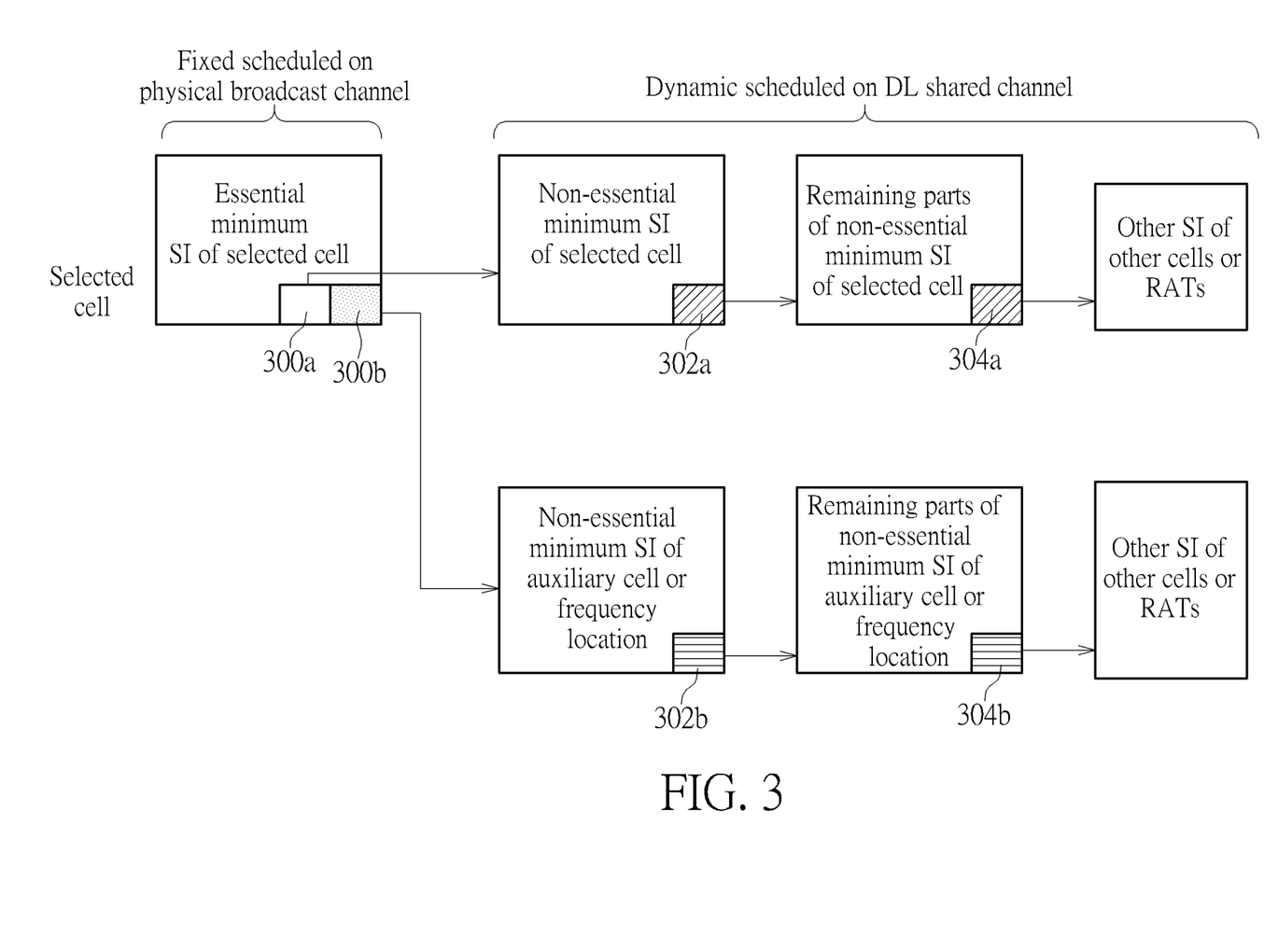
FIGS. 3-7 are schematic diagrams of system information scheduling according to the present disclosure.

Please refer to FIG. 3, which illustrates an embodiment of SI scheduling. The UE detects a frequency location and bandwidth to select a cell, and then receives the essential minimum SI of the selected cell on the fixed scheduled broadcast channel that the size and periodicity of the information carried by which is predefined in the specification depending on carrier frequency range. The essential minimum SI is usually a single system information block (SIB), such as master information block (MIB), and includes at least one of scheduling information 300a for non-essential minimum SI of the selected cell and scheduling information 300b for non-essential minimum SI of the auxiliary cell or frequency location. The non-essential minimum SI is usually one or more SIBs transmitted by one or more SI messages on dynamic scheduled downlink shared channel. In an example, the non-essential minimum SI could be a system information block type 1 (SIB1) and could be transmitted via a radio resource control (RRC) message from the network. In addition, the scheduling information 300a or 300b include information of associated SIB 1 CORESET (Control Resource Set, which indicates the radio resource configuration of SIB1 including at least the configuration information of frequency, time, bandwidth, common search space). Thus, the UE receives the non-essential minimum. SI on the DL shared channel that the size and periodicity of the information carried by which is dynamically scheduled depending on carrier frequency range and/or time according to the scheduling information 300a or 300b of the essential minimum SI. Note that, the availability information of the scheduling information 300a or 300b in the essential minimum SI are used for quickly identifying whether the non-essential minimums SI is presented in or broadcasted by the selected cell, so as to determine whether the selected cell is campable. In an example, the availability information is included in a 8-bit of information of the SIB1 CORESET.

In addition, the content of the received non-essential minimum SI includes supported bandwidth (e.g. in terms of resource blocks (RBs)), validity information, a list of public land mobile network identity (PLMN ID), a cell ID, at least one of scheduling information 302a and 302b for the remaining parts of the non-essential minimum SI (multiple SIBs) and other SI (may include multiple SIBs of selected cell and may include multiple SIBs of auxiliary cells), number of downlink and/or uplink beam sweeps, and downlink and/or uplink beam configuration. The scheduling information 302a and 302b may include SI mapping information for associating at least a system information block (SIB) with a message for SI transmission, repetition information, SI window length, and an availability indication for indicating that the SIB is periodically broadcasted or on-demand. Thus, the UE receives the remaining parts of the non-essential minimum SI with dynamic scheduled on the DL shared channel according to the scheduling information 302a or 302b of the non-essential minimum SI. The validity information includes an identity of the non-essential minimum SI, version information (e.g. a value tag, version number), wherein the version information of the non-essential minimum SI changes if the content of one or more information blocks of non-essential minimum SI change, and an applicable area ID (e.g. one or more area codes/group codes/physical cell IDs). In an embodiment, the identity of the non-essential minimum SI includes time domain positions of the transmitted synchronization signal blocks (SS-blocks) in an SS-Burst-Set as defined in 3GPP TS 38.213.

Moreover, the content of the remaining parts of the non-essential minimum SI includes the following information:

1. A list of information to present the availability of SIBs/SI messages provided by the selected cell and auxiliary cell/frequency. Each entity of the list may include:

1-1. An identity of the SIB/SI message: the identity of the SIB/SI message that is provided by the selected cell and auxiliary cell/frequency;

1-2. Availability indication: SIB/SI message is periodically broadcasted or on-demand (i.e. the SIB/SI message is transmitted based on UE acquisition; the system information is transmitted by the network upon receiving at least a request from one or more UEs for acquiring the SIB or the SI message); and 1-3. Version info: e.g., version number or value tag, wherein the version info is per-SIB specific;

2. A list of scheduling information 304a-304b for other SI (i.e. one or multiple SIBs/SI messages) related to other cells or other RATs, each entity of the list may include:

2-1. SI mapping info;

2-2. Repetition info; and 2-3. SI window length.

Note that, based on the availability indication of the remaining parts of the non-essential minimum SI, the UE knows the SIBs/SI messages is periodically broadcasted or on-demand, so as to acquire the SIBs/SI messages. In addition, the scheduling information 304a-304b associated with on-demand SIB/SI message may be pre-scheduled regardless of the actual being broadcast or not of the on-demand SIB/SI message at the instant in time, or the scheduling information 304a-304b associated with on-demand SIB/SI message may be scheduled dynamically regarding the broadcast of the on-demand SIB/SI message.

Figure 4:
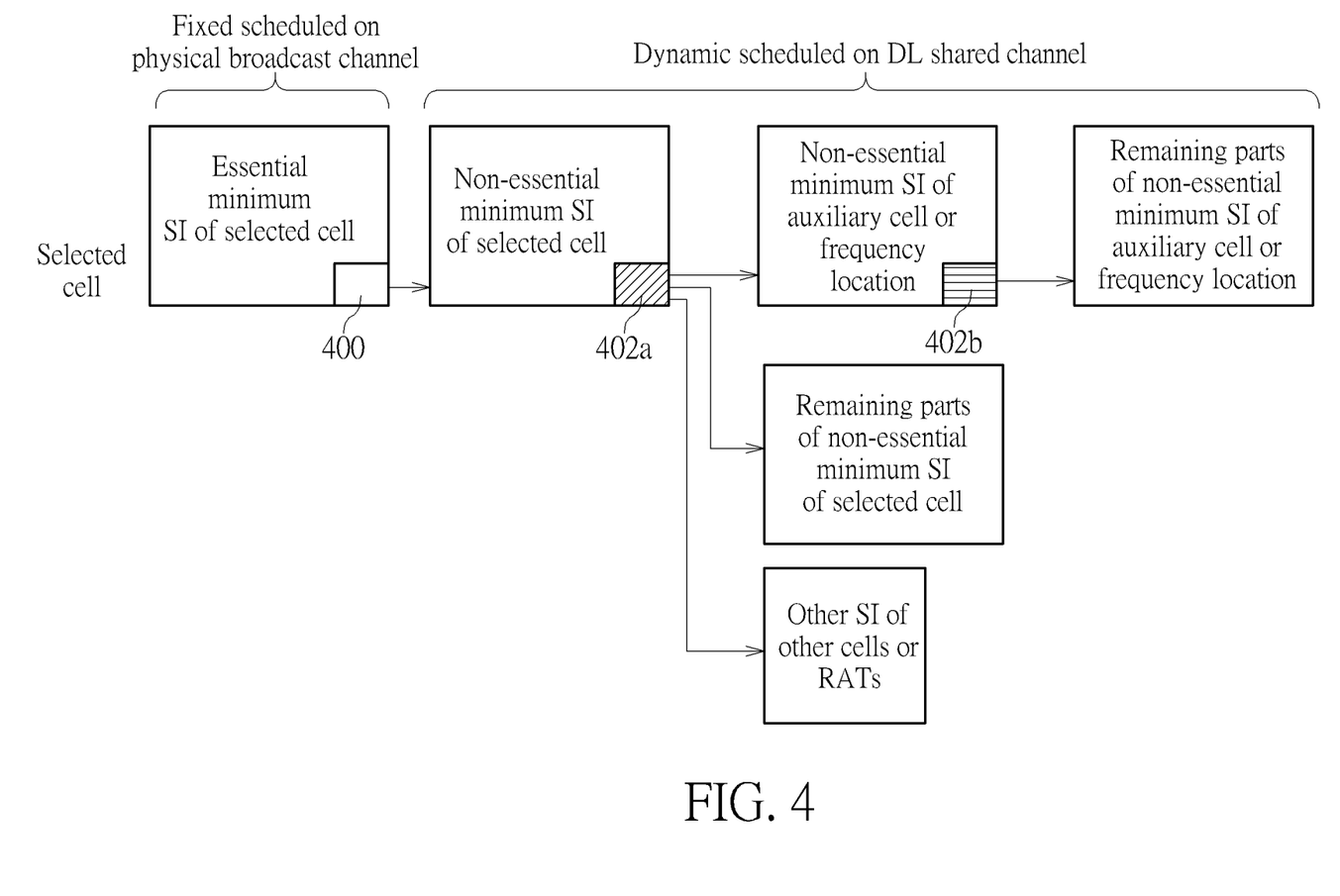

For more system information scheduling example, reference is made to FIGS. 4-7. In FIG. 4, the content of the essential minimum SI of selected cell includes the scheduling information 400 only for the non-essential minimum SI of the selected cell, and the non-essential minimum SI of the selected cell may include the scheduling information 402a for the non-essential minimum SI of auxiliary cell or frequency location, remaining parts of non-essential minimum SI of the selected cell, and other SI of other cells or other RATs. On the other hand, the non-essential minimum SI of auxiliary cell or frequency location includes scheduling information 402b for the remaining parts of non-essential minimum SI and other SI of other cells or other RATs.

Figure 5:
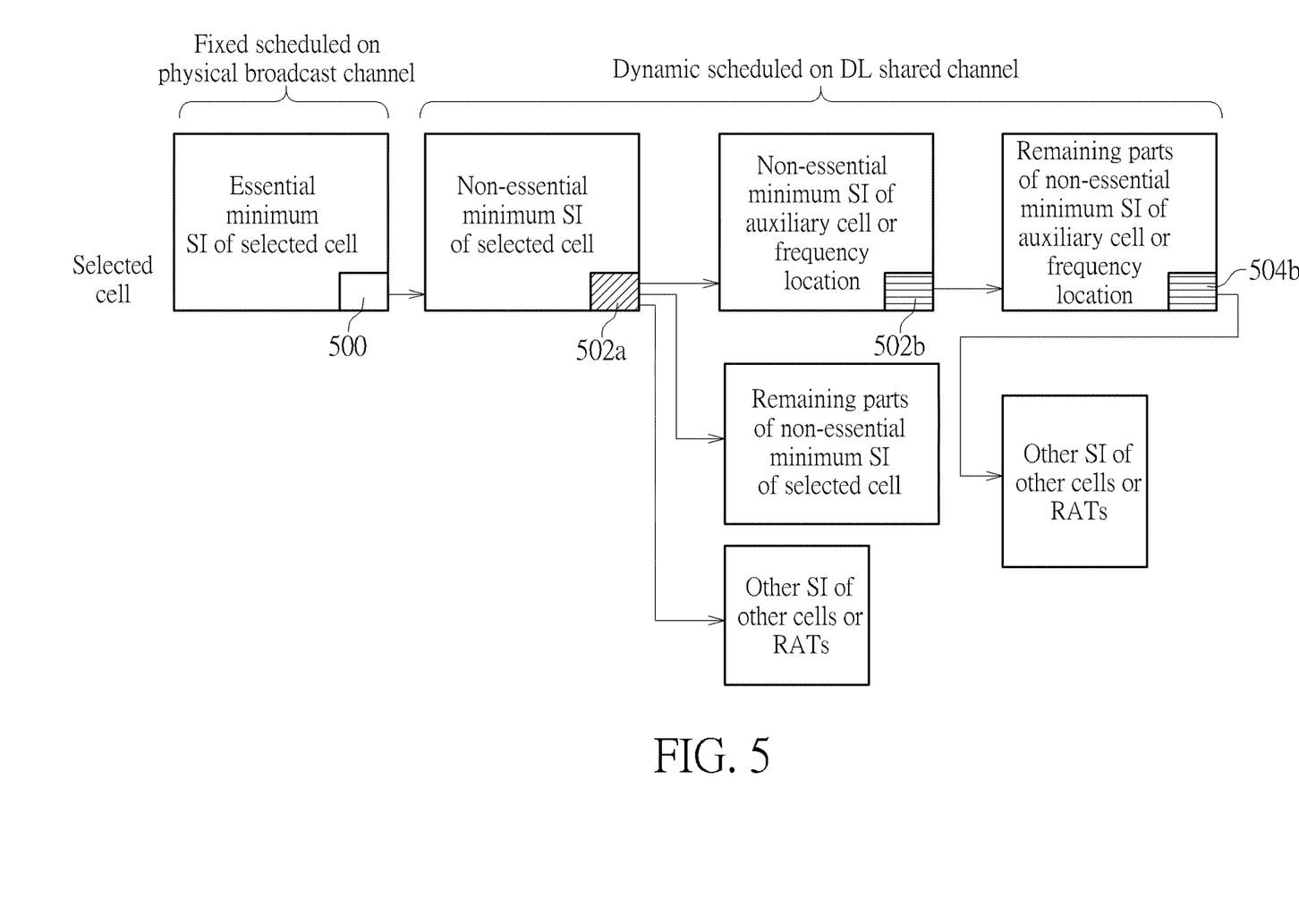

Compared to the abovementioned embodiment of FIG. 4, the non-essential minimum SI of auxiliary cell or frequency location of FIG. 5 includes the scheduling information 502b only for the remaining parts of non-essential minimum SI of auxiliary cell or frequency location, and the remaining parts of non-essential minimum SI of auxiliary cell or frequency location includes the scheduling information 504b for the other SI of other cells or other RATs.

Figure 6:
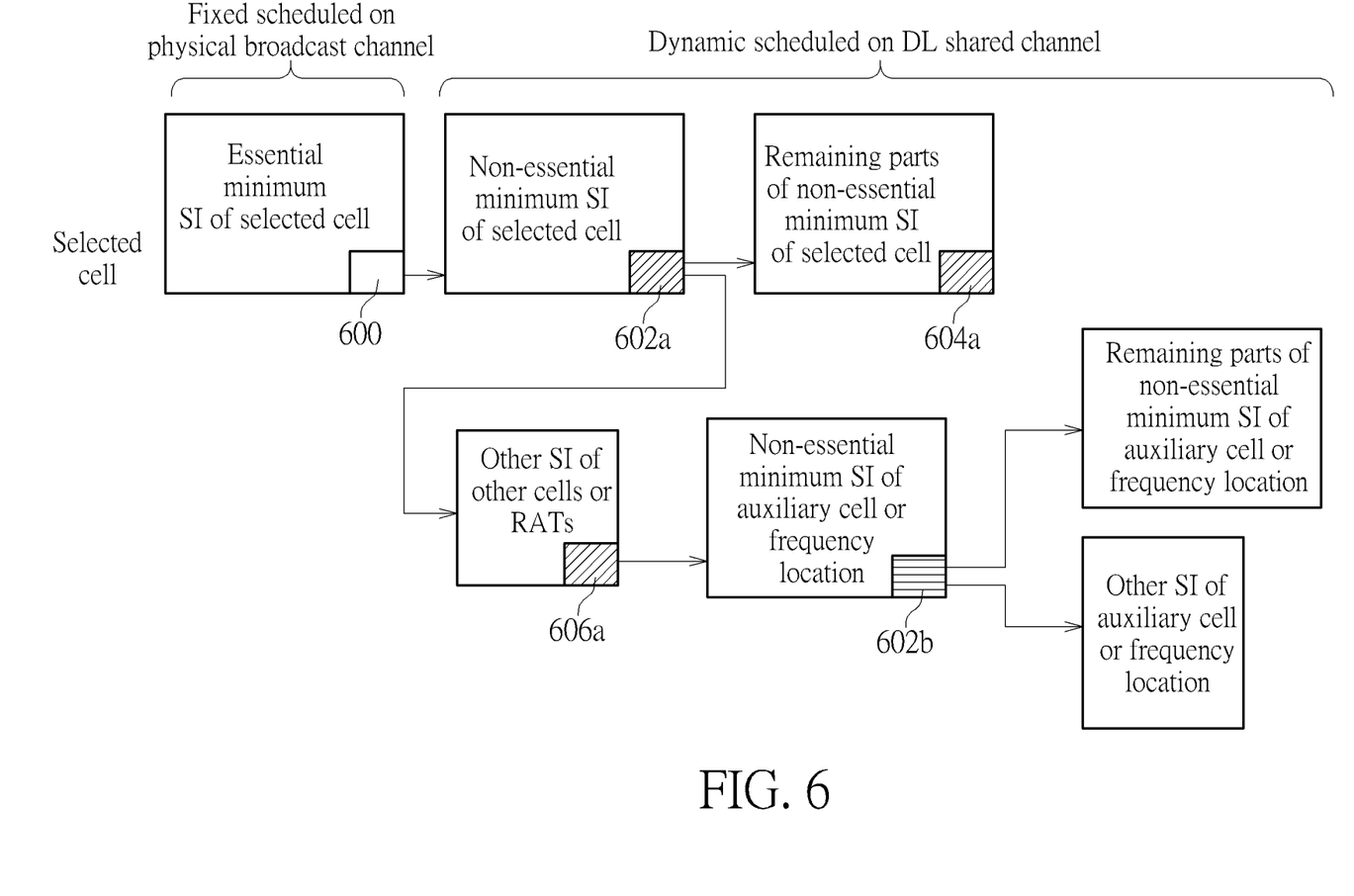

In FIG. 6, the non-essential minimum SI of the selected cell does not include the scheduling information for the non-essential minimum SI of auxiliary cell or frequency location, whereas the scheduling information for the non-essential minimum SI of auxiliary cell or frequency location is includes in the other SI of other cells or other RATs.

Figure 7:
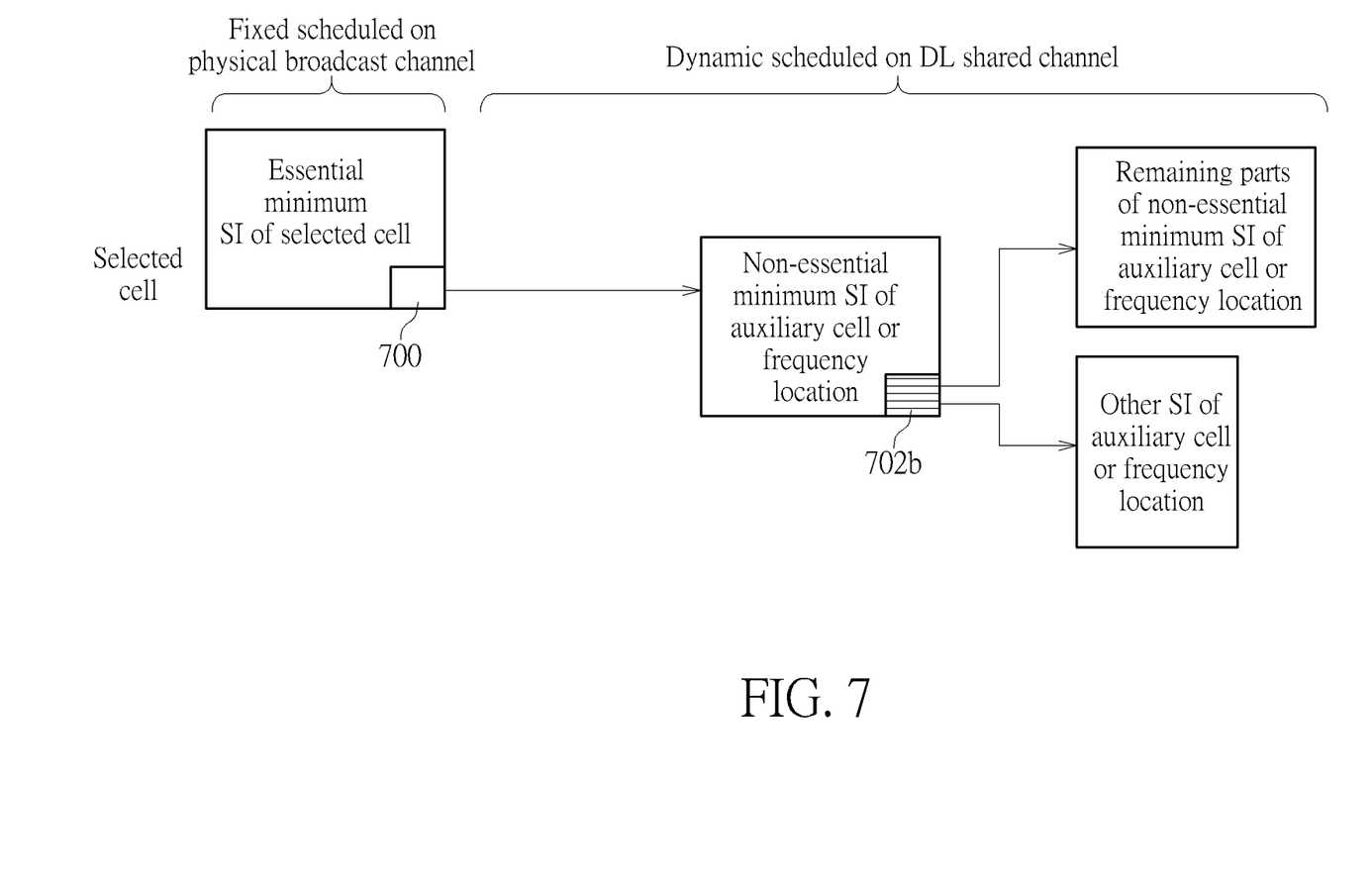

Compared to the abovementioned embodiment of FIG. 4, in FIG. 7, the essential minimum. SI of selected cell includes the scheduling information 700 only for the non-essential minimum SI of auxiliary cell or frequency location. The non-essential minimum SI of auxiliary cell or frequency location includes the scheduling information 702b for the remaining parts of non-essential minimum SI and other SI of auxiliary cell or frequency location.

Figure 8:
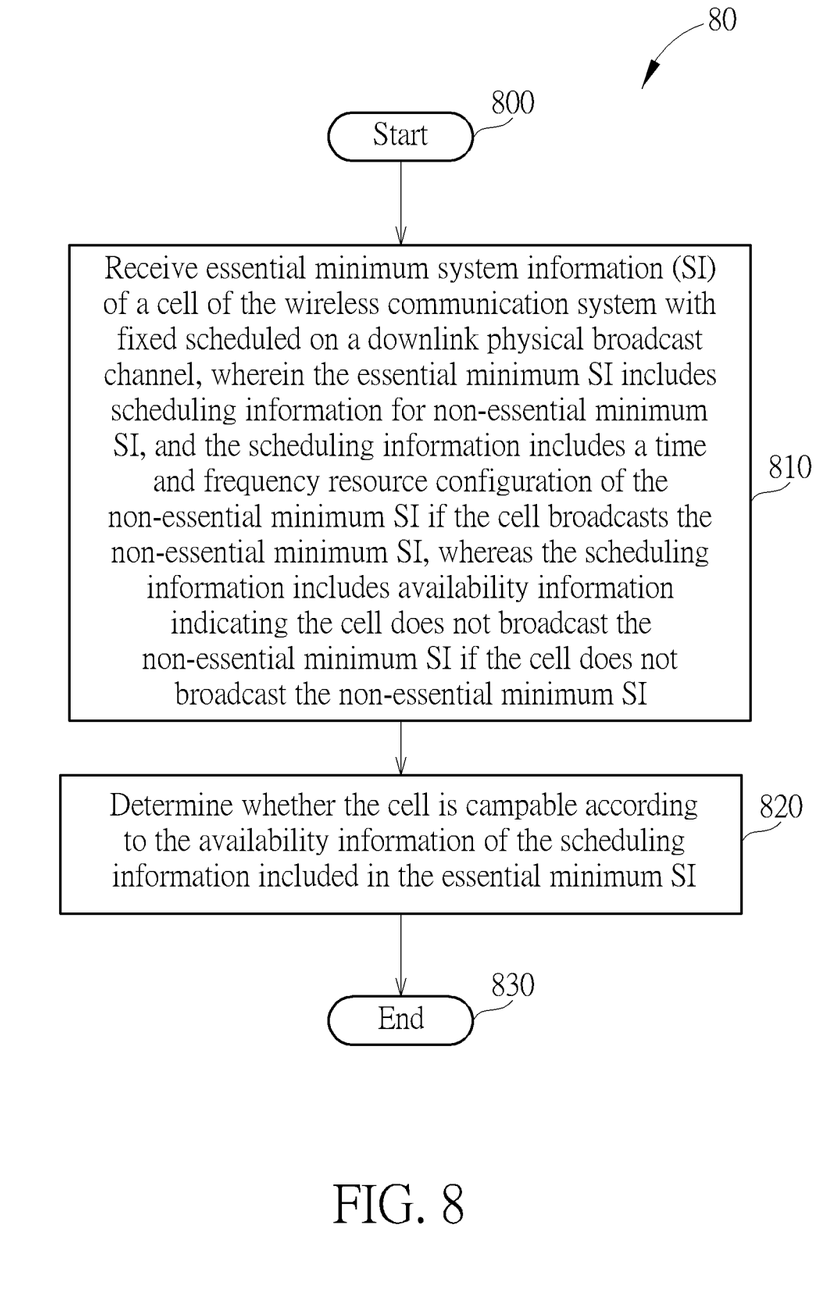
FIG. 8 is a flowchart of an exemplary process according to the present disclosure.

Please refer to FIG. 8, which is a flowchart of a process 80 according to an example of the present disclosure. The process 80 is utilized in the UE of FIG. 1 for SI acquisition. The process 80 may be compiled into a program code 114 to be stored in the storage unit 110, wherein the information received during process 80 may be stored into the stored data 115 of the storage unit 110 and may include the following steps:

Step 800: Start.

Step 810: Receive essential minimum system information (SI) of a cell of the wireless communication system with fixed scheduled on a downlink physical broadcast channel, wherein the essential minimum SI includes scheduling information for non-essential minimum SI, and the scheduling information includes a time and frequency resource configuration of the non-essential minimum SI if the cell broadcasts the non-essential minimum SI, whereas the scheduling information includes availability information indicating the cell does not broadcast the non-essential minimum SI if the cell does not broadcast the non-essential minimum SI.

Step 820: Determine whether the cell is campable according to the availability information of the scheduling information included in the essential minimum SI.

Step 830: End.

According to the process 80, the UE determines whether the cell is campable or barred, and knows how to acquire the non-essential minimum SI according to the parameters included in the scheduling information of the received essential minimum SI. For example, the UE knows that the cell is campable if the availability information indicates that the selected cell broadcasts the non-essential minimum SI for cell selection and cell access.

Figure 9:
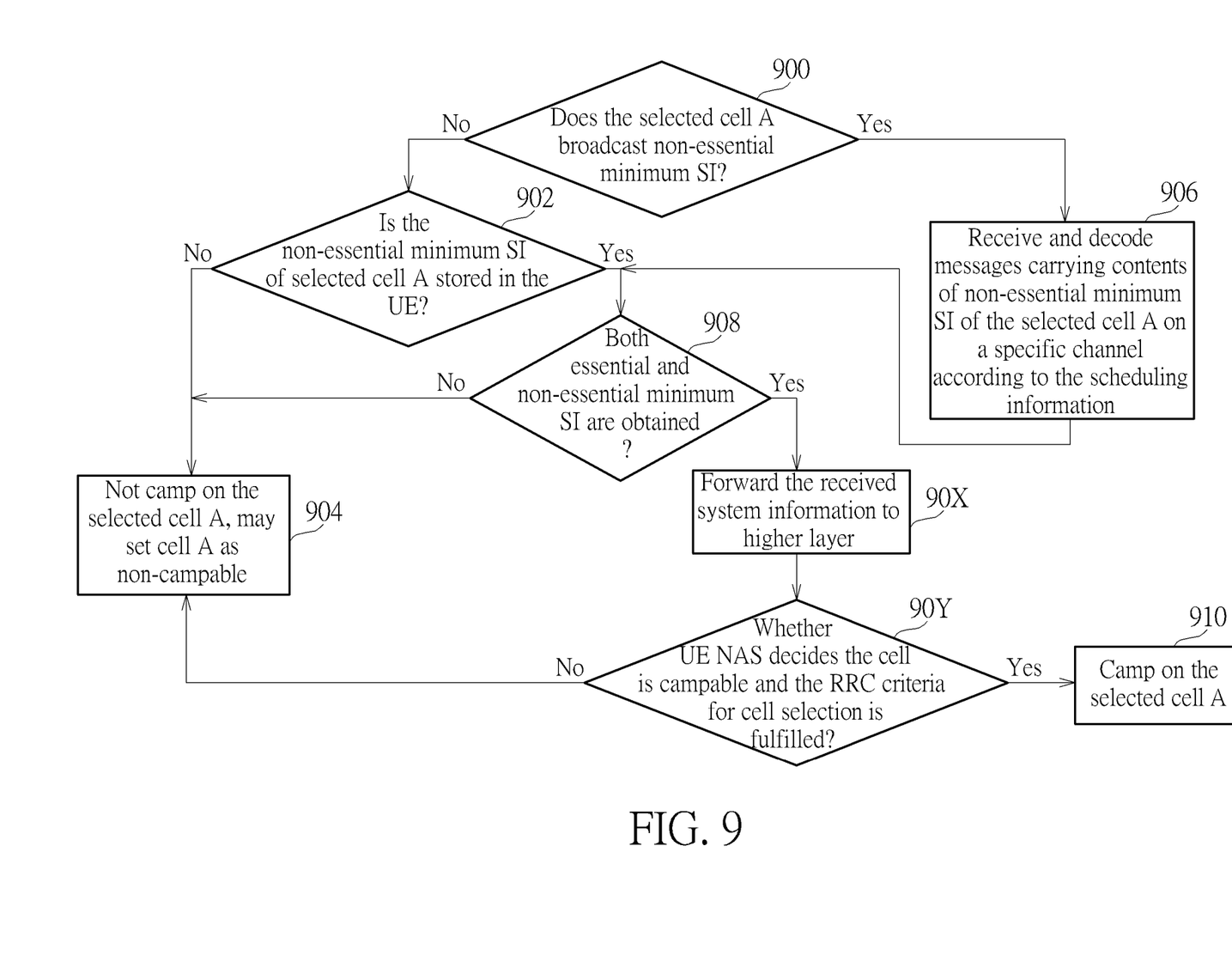
FIGS. 9-12 are schematic diagrams of system information acquisition according to the present disclosure.

Please refer to FIG. 9, which illustrates system information acquisition for cell selection according to the present disclosure. First, the UE receives the essential minimum SI from the selected cell, and determines whether the selected cell broadcasts the non-essential minimum SI of the selected cell or broadcasts the non-essential minimum SI of the auxiliary cell/frequency location according to the availability information indicating the presence or absence of the non-essential minimum. SI. If the selected cell does not broadcast the non-essential minimum SI, the UE determines that the selected cell is not campable or barred. When UE detects the selected cell does not broadcast the non-essential minimum SI, the UE may further check whether a valid non-essential minimum SI of the selected SI is stored in the UE before determining that the selected cell is not campable or barred; if a valid non-essential minimum SI of the selected SI is stored in the UE, the UE may utilize the stored non-essential minimum SI (steps 900 and 902). The validity of the stored non-essential minimum SI could be determined by e.g., a timer. On the other hand, if the selected cell broadcasts the non-essential minimum SI, the UE receives the non-essential minimum SI with the abovementioned scheduling information of FIGS. 3-7 (step 906). If the select cell broadcasts neither the non-essential minimum SI of the selected cell nor the auxiliary cell or frequency location, and there is no valid non-essential minimum SI associated with the selected cell stored in the UE, the UE determines that the selected cell is non-campable (step 904). On the other hand, if the selected cell broadcasts neither the non-essential minimum. SI of the selected cell nor the auxiliary cell or frequency location, but there is valid non-essential minimum SI associated with the selected cell stored in the UE, the UE receives the non-essential minimum SI and determines whether the entire minimum SI (i.e., the essential minimum SI and the entire non-essential minimum SI) is obtained (step 908). If yes, the UE provides the information received from the essential minimum SI to the non-access stratum (NAS) layer for cell selection or reselection (step 90X). The UE may select and camp on the cell based on NAS decision and the RRC criteria for selecting a cell are fulfilled (steps 90Y and 910). If the entire minimum SI does not be obtained, the UE determines the selected cell is non-campable (step 904). In addition, the UE may obtain the remaining part of the non-essential minimum SI and/or the other SI if the non-essential minimum SI includes scheduling information of the remaining part of the minimum SI and/or the other SI, the UE receives the remaining part of non-essential minimum SI and/or other SI accordingly.

Figure 10:
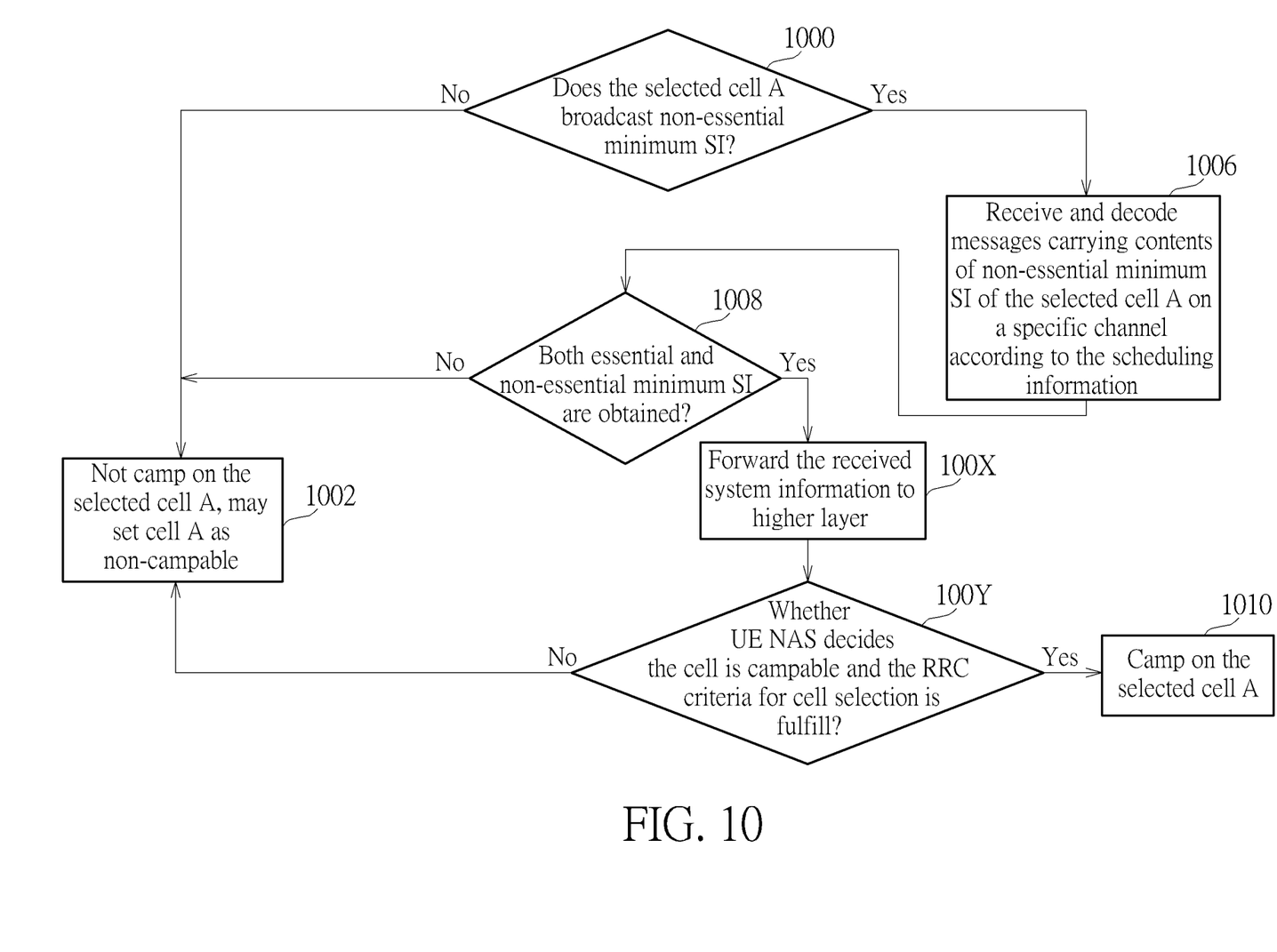

Compared to the embodiment of FIG. 9, if the select cell does not broadcast the non-essential minimum SI of the selected cell, the UE determines that the selected cell is non-campable or barred, as shown in FIG. 10.

Figure 11:
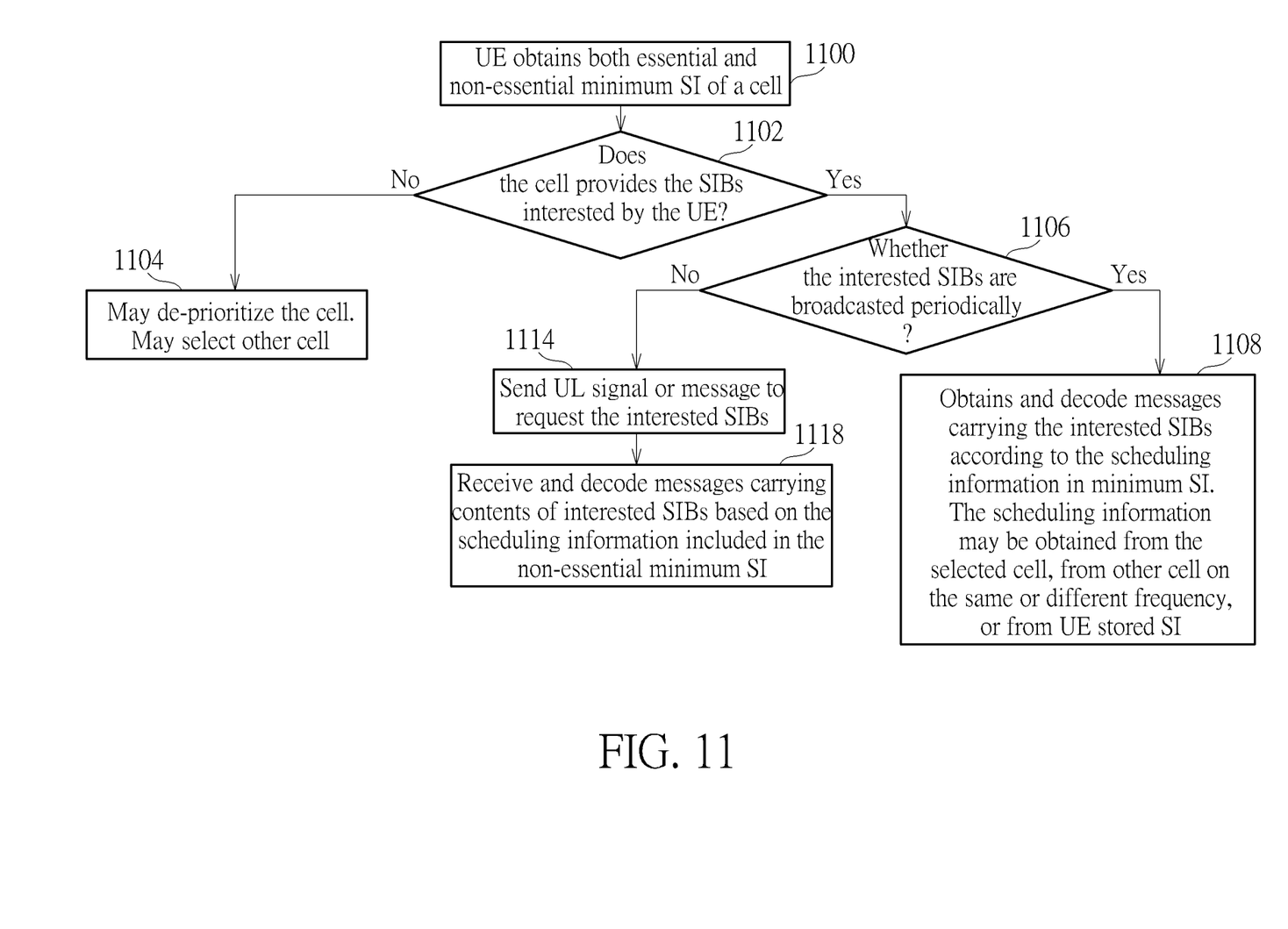

Moreover, reference is made to FIG. 11 for SI acquisition. The UE obtains the scheduling information of the remaining parts of the non-essential minimum SI of a cell included in the non-essential minimum SI of the selected cell (step 1100), and then determines whether the SIBs interested by the UE is provided by the cell (e.g., determined by whether the interested SIB is presented in the scheduling information) (step 1102). If the interested SIB is not provided by the selected cell, the UE may de-prioritize the cell, and may select other cells (step 1104). If the interested SIB is provided by the selected cell, the UE may further determining (e.g., by comparing the validity information of the interested SIB in the scheduling information and the validity information of the interested SIB stored in the UE) whether to obtain the interested SIB from the serving cell or to utilize the information of the interested SIB stored by the UE. If the interested SIBs are provided by the cell and the UE decides to obtain the interested SIB from the serving cell, the UE further checks whether the interested SIBs are broadcasted periodically according to availability indication of the remaining parts of non-essential minimum. SI (step 1106). If yes, the UE obtains the interested SIBs according to the scheduling information of the remaining parts of non-essential minimum SI of the cell (steps 1108). Note that, in an embodiment, the scheduling information may be obtained from other cell on the same or different frequencies or from stored SI. If the interested SIB is on-demand, the UE sends one or more SI request signals to the cell to acquire the interested SIB without waiting for the SI window of the interested SIB (i.e., UE sends SI request immediately) (step 1114), and then receives the interested SIBs from the cell according to the scheduling information of the cell (steps 1118).

Figure 12:
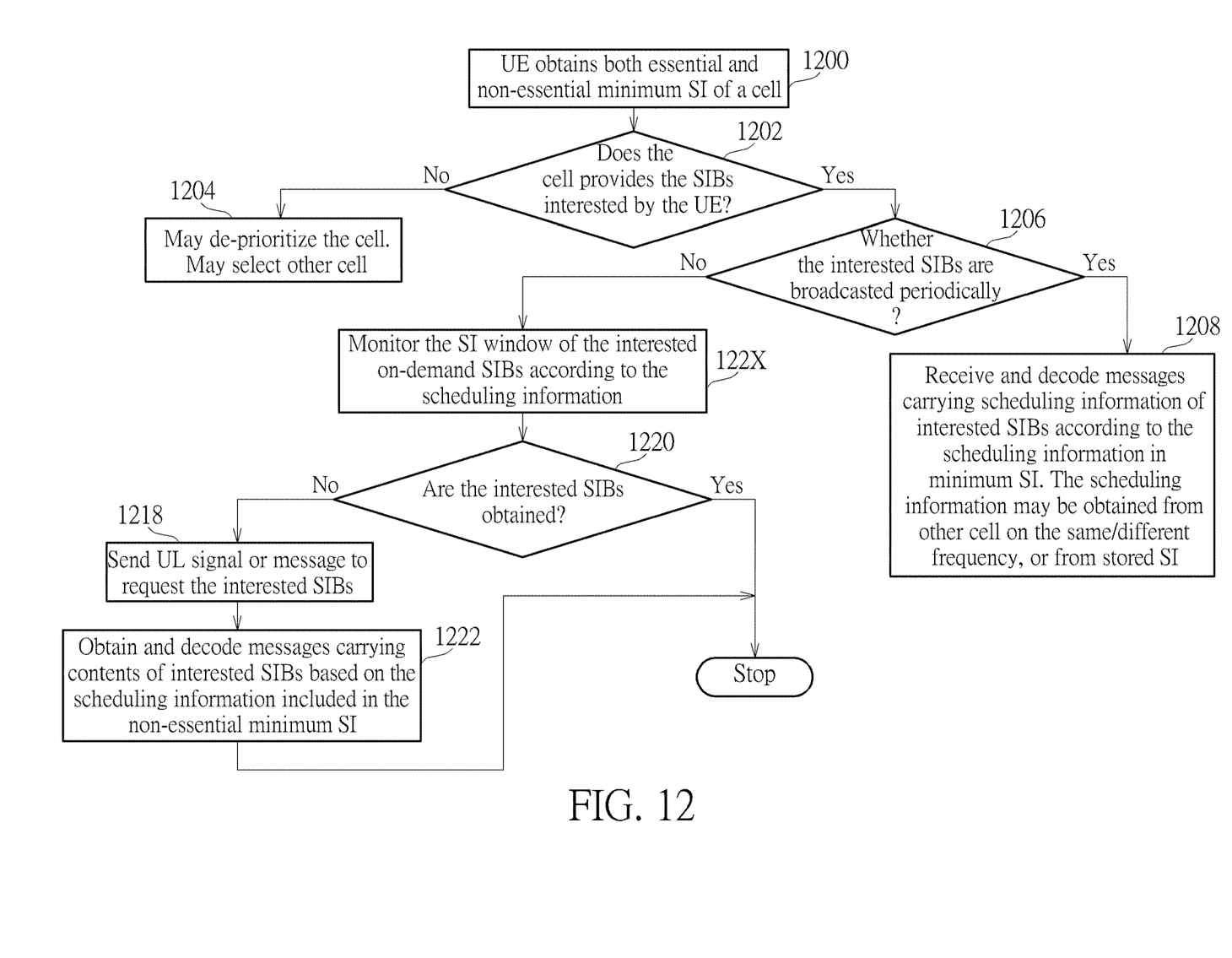

Compared to the embodiment of FIG. 11, after the UE determines that the interested SIBs are on-demand, the UE does not immediately send the SI request, but monitors the SI window of the interested on-demand SIB before sending the SI request, as shown in FIG. 12. If the UE receives the interested SIBs during the SI window, the UE does not send the SI request for SIB acquisition; otherwise, UE sends SI request to acquire the interested SIB. The SI request could be SIB-specific request or SI message specific request. The SI request could be a preamble associated with the interested SIB or SI message, a MAC control element includes the ID of the acquired SIB or SI message, or a RRC message indicates the acquired SIB or SI messages.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 10.

In conclusion, the present invention addresses to contents/parameters of system information for cell selection, cell access and SI acquisition. In detail, the cell includes the availability information in the scheduling information. Thus, the UE knows whether the cell is campable and how to acquire the non-essential minimum SI according to the received SI.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of system information transmission for a cell in a wireless communication system, the method comprising:
    broadcasting essential minimum system information (SI) of the cell of the wireless communication system with fixed size on a downlink broadcast channel, wherein the essential minimum SI includes a first scheduling information for non-essential minimum SI of at least one of the cell, an auxiliary cell or a frequency location, and the essential minimum SI includes a time and frequency resource configuration and an availability information for indicating whether the cell broadcasts the non-essential minimum SI; and
    broadcasting the non-essential minimum SI with dynamically scheduled on a downlink shared channel according to the availability information, such that a mobile device in the wireless communication system is able to obtain the non-essential minimum SI with dynamic scheduled on the downlink shared channel according to the first scheduling information of the essential minimum SI, to determine whether the cell broadcasts remaining parts of the non-essential minimum SI according to a second scheduling information included in the obtained non-essential minimum SI, and to obtain the remaining parts of the non-essential minimum SI according to the second scheduling information;
    wherein the availability information is set to a first value for indicating that the cell broadcasts the non-essential minimum SI, and is set to a second value for indicating that the cell does not broadcast the non-essential minimum SI;
    wherein the non-essential minimum SI is a minimum SI.

2. The method of claim 1, wherein the non-essential minimum SI includes at least one of a supported bandwidth, a validity information, an identity of the non-essential minimum SI, a version information, an applicable area identity, the second scheduling information for at least one of the remaining parts of the non-essential minimum SI and other SI related to other cells or other radio access technologies (RATs), a list of public land mobile network (PLMN) identities, a cell identity, number of downlink beam sweeps, or downlink and uplink beam configuration.

3. The method of claim 2, wherein the validity information of the non-essential minimum SI changes when at least one of the remaining parts of the non-essential minimum SI and other SI related to other cells or other radio access technologies (RATs) changes.

4. The method of claim 1, wherein the second scheduling information includes the scheduling information of the remaining parts of the non-essential minimum SI and other SI related to other cells or other radio access technologies (RATs) regardless of the actual being broadcast or not of the remaining parts of the non-essential minimum SI and other SI related to other cells or other radio access technologies (RATs).

5. The method of claim 2, wherein the remaining parts of the non-essential minimum SI includes a third scheduling information for the other SI.

6. The method of claim 2, wherein the other SI includes scheduling information for the non-essential minimum SI of the auxiliary cell or the frequency location.

7. The method of claim 2, wherein the applicable area identity includes at least one of area codes, group codes, or physical cell identities.

8. The method of claim 1, wherein the essential minimum SI further includes an identity of the essential minimum SI, and the first scheduling information further includes a type identifier for the non-essential minimum SI, bandwidth, carrier frequency information for associating the non-essential minimum SI with the essential minimum SI, and timing information for associating the non-essential minimum SI with the essential minimum SI.

9. The method of claim 1, wherein the non-essential minimum SI of the cell includes the scheduling information for the non-essential minimum SI of the auxiliary cell or the frequency location.

10. The method of claim 1, wherein the second scheduling information includes at least one of SI mapping information for associating at least a system information block (SIB) with a message for SI transmission, repetition information, SI window length, or an availability indication for indicating that the SIB is periodically broadcasted or on-demand.

11. The method of claim 10, wherein the transmission resource of the on-demand SIB is pre-scheduled.

12. A method of system information acquisition for a mobile device in a wireless communication system, the method comprising:
receiving essential minimum system information (SI) of a cell of the wireless communication system with fixed size on a downlink broadcast channel, wherein the essential minimum SI includes a first scheduling information for non-essential minimum SI, and the essential minimum SI includes a time and frequency resource configuration and an availability information for indicating whether the cell broadcasts the non-essential minimum SI, and wherein the availability information is set to a first value for indicating that the cell broadcasts the non-essential minimum SI, and is set to a second value for indicating that the cell does not broadcast the non-essential minimum SI;
obtaining the non-essential minimum SI with dynamic scheduled on a downlink shared channel according to the first scheduling information of the essential minimum SI when the availability information indicates that the cell broadcasts the non-essential minimum SI;
determining whether the cell broadcasts remaining parts of the non-essential minimum SI according to a second scheduling information included in the obtained non-essential minimum SI;
obtaining the remaining parts of the non-essential minimum SI according to the second scheduling information; and
determining whether the cell is campable according to the availability information of the first scheduling information;
wherein the non-essential minimum SI is a minimum SI.

13. The method of claim 12, wherein the non-essential minimum SI includes at least one of a supported bandwidth, a validity information, an identity of the non-essential minimum SI, a version information, an applicable area identity, the second scheduling information for at least one of the remaining parts of the non-essential minimum SI and other SI related to other cells or other radio access technologies (RATs), a list of public land mobile network (PLMN) identities, a cell identity, number of downlink beam sweeps, or downlink and uplink beam configuration.

14. The method of claim 13, wherein the validity information of the non-essential minimum SI changes when at least one of the remaining parts of the non-essential minimum SI and other SI related to other cells or other radio access technologies (RATs) changes.

15. The method of claim 12, wherein the second scheduling information includes the scheduling information of the remaining parts of the non-essential minimum SI and other SI related to other cells or other radio access technologies (RATs) regardless of the actual being broadcast or not of the remaining parts of the non-essential minimum SI and other SI related to other cells or other radio access technologies (RATs).

16. The method of claim 12, further comprising selecting the cell for access when the essential minimum SI and the non-essential minimum SI are obtained.

17. The method of claim 12, wherein determining whether the cell is campable according to the availability information of the first scheduling information comprises:
checking if the non-essential minimum SI is stored in the mobile device or is valid when the availability information indicates that the cell dose not broadcast the non-essential minimum SI;
determining that the cell is not campable when the first availability information indicates that the cell does not broadcast the non-essential minimum SI and the non-essential minimum SI is not stored in the mobile device or is not valid.

18. The method of claim 12, further comprising:
determining whether the cell broadcasts the remaining parts of the non-essential SI for an auxiliary cell or a frequency location according to the second scheduling information included in the non-essential minimum SI; and
obtaining the remaining parts of the non-essential minimum SI for the auxiliary cell or the frequency location according to the second scheduling information when the cell broadcasts the remaining parts of the non-essential minimum SI for the auxiliary cell or the frequency location.

19. The method of claim 12, further comprising:
determining whether the cell provides a system information block (SIB) interested by the mobile device according to the second scheduling information of the obtained non-essential minimum SI; and determining whether the interested SIB is broadcasted periodically or transmitted on-demand according to the second scheduling information.

20. The method of claim 19, further comprising:

monitoring a SI window for the interested SIB according to the second scheduling information to obtain the interested SIB before sending a SI request when determining the interested SIB is on-demand;

determining whether the interested SIB is obtained during the scheduled SI window according to the second scheduling information;

sending the SI request to request the interested SIB to the cell when determining the interested SIB is provided by the cell and is on-demand but the interested SIB is not obtained during the scheduled SI window;

deprioritizing the cell when the cell does not broadcast the interested SIB;

obtaining the interested SIB according to the second scheduling information when determining the interested SIB is periodically broadcast;

sending a SI request to request the interested SIB to the cell when determining the interested SIB is on-demand; or obtaining the interested SIB according to the second scheduling information after sending the SI request.

* * * * *